Oct. 26, 1943.   D. ROLLO ET AL   2,332,934
PROCESS FOR THE PRODUCTION OF DISPERSIBLE SULPHUR
Filed Aug. 20, 1941
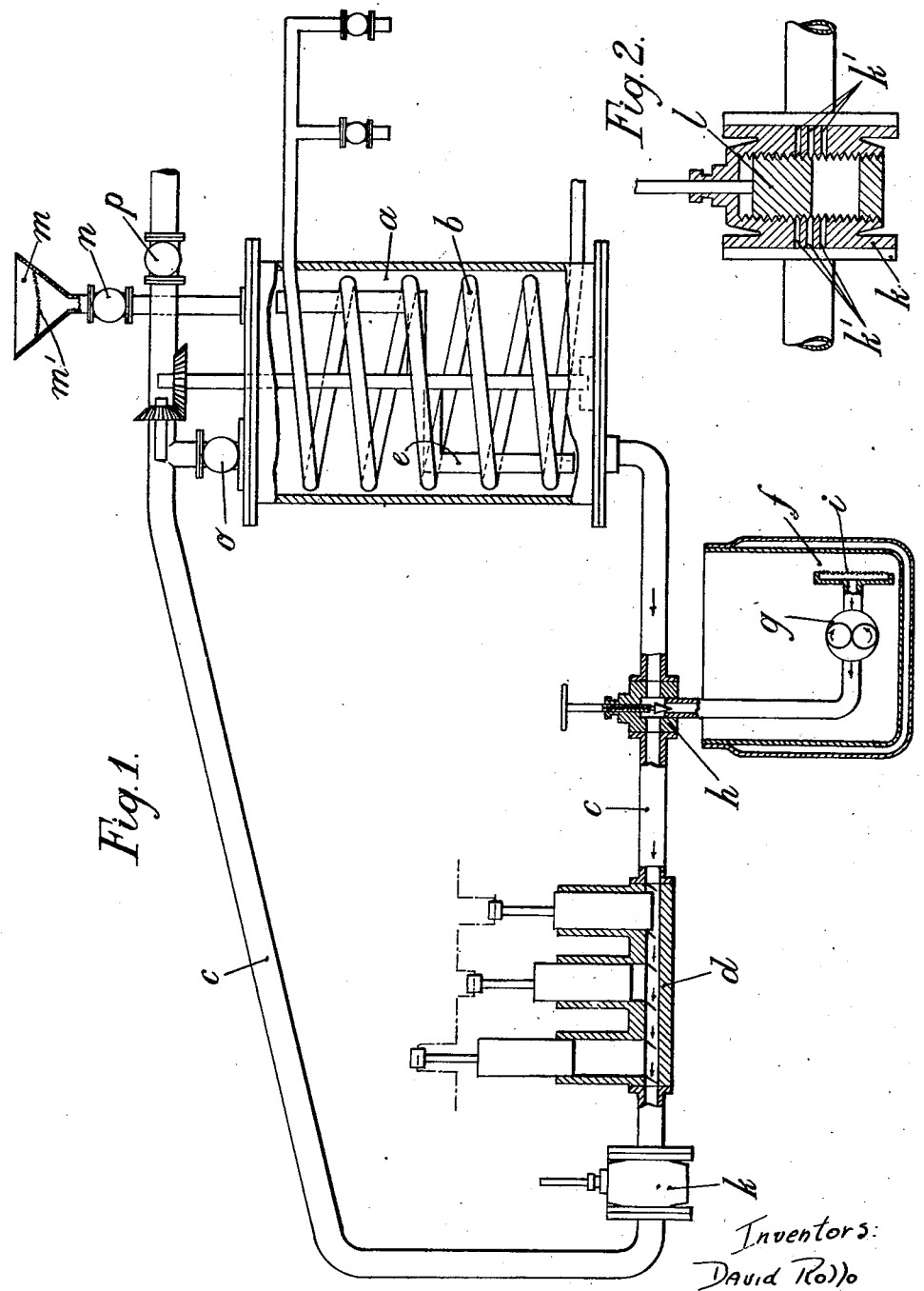
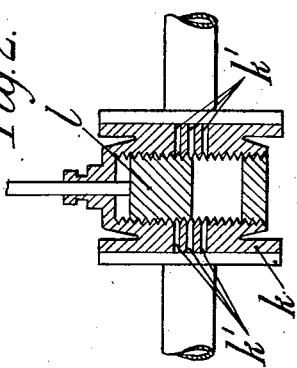
Inventors:
David Rollo
Ronald McIntyre
E. S. R. Willmore
By: Glascock Downing + Seebold
Attys.

Patented Oct. 26, 1943

2,332,934

UNITED STATES PATENT OFFICE 2,332,934

PROCESS FOR THE PRODUCTION OF DISPERSIBLE SULPHUR

David Rollo, Ronald McIntyre, and Edward Sydney Redvers Willmore, Berkhamsted, England, assignors to Cooper, McDougall & Robertson Limited, Berkhamsted, England Application August 20, 1941, Serial No. 407,650
In Great Britain May 3, 1941

5 Claims. (Cl. 252—309)

This invention relates to the production of dispersible or colloidal sulphur and has for its object to devise an improved process and apparatus for such production.

The invention consists in a process for the production of dispersible sulphur which consists in emulsifying a mixture of molten sulphur and a protective colloid solution containing sulphite lye and subsequently cooling the emulsion to form a paste.

The invention also consists in a process for producing dispersible sulphur in powder form which consists in first forming a paste in accordance with the preceding paragraph, incorporating in the paste with suitable additions and finally drying in vacuo.

The invention also consists in apparatus for producing dispersible sulphur in the form of paste comprising a system for heating and circulating a protective colloid solution, means for injecting the molten sulphur into the circulating heated solution and means for producing an emulsion by forcing the mixture under pressure through a jet or jets.

The invention also consists in apparatus according to the preceding paragraph having means for varying the emulsifying pressure to vary the particle size of the sulphur.

Further features of the invention will be apparent from the description given hereafter.

The accompanying drawing illustrates one convenient form of apparatus in accordance with the invention.

Figure 1 is a more or less diagrammatic elevation of the apparatus, and

Figure 2 is a sectional elevation on a somewhat larger scale of a part shown in Figure 1.

In carrying our invention into effect in one convenient manner we form our improved apparatus with a vessel $a$ in which the protective colloid solution is placed, the vessel being adapted to be heated by an internal steam coil $b$, by external steam jackets or by other suitable means.

The vessel is connected with a suitable pipe system $c$ in which the protective colloid solution may be circulated by means of a pump $d$ which should be capable of developing a high pressure, say, up to 600 lbs. per square inch or higher, for which purpose we find a 3-throw hydraulic ram pump to be eminently suitable although it will be understood that any other convenient form of circulating device may be adopted.

The heating vessel may be provided with a stirrer $e$ and the various parts of the circulating system may, if necessary, be suitably lagged while thermometers may be included in suitable positions to enable the temperature of the circulating medium to be ascertained.

The apparatus further comprises a vessel $f$ adapted to contain molten sulphur and an injection pump $g$ (for example, a gear pump) is arranged to operate within the molten sulphur so that the latter may be injected through a needle or other suitable type of valve $h$ into the pipe system in which the heated protective colloid solution circulates. The injection pump is conveniently provided with a filter $i$ upon its inlet to prevent the entry of solid matter into the pump, and there may also be an automatic release to prevent pressure building up beyond a predetermined level.

The circulating system also includes a jetting device by means of which the mixture of molten sulphur and protective colloid solution may be emulsified by being forced through the jetting device under a high pressure developed by the circulating pump.

In one convenient construction the emulsifying device may consist of a threaded barrel $k$ inserted in the circulating pipe system and provided with a plurality of fine apertures $k'$ constituting jets through which the mixture is forced for emulsification. Within the barrel we arrange a threaded plug $l$ which may be adjusted by hand so as to cover more, or fewer of the holes through which the mixture passes for emulsification, the arrangement being such that by altering the setting of the screwed plug more or fewer holes are covered thus increasing or reducing the pressure generated by the pump. Any equivalent device for emulsifying and varying the emulsifying pressure may be employed and the jets may either be parallel or may be arranged to impinge upon one another as desired.

The heating vessel $a$ is provided with a filling device $m$ preferably fitted with a filter $m'$ and controlled by a valve $n$ by means of which filling device the protective colloid solution may be filled into the vessel. The inlet connection from the circulating pipe $c$ to the vessel $a$ is provided with a suitable valve $o$ while there is also a further valve $p$ controlling the outlet from the circulating system.

In operation the protective colloid solution is inserted into the heating vessel which is thereupon heated and with the outlet valve $p$ from the circulating system and the valve $n$ in the filling device and the needle valve $h$ controlling the molten sulphur closed, the circulating pump $d$ is started up and circulation proceeds until the temperature of the protective colloid solution and the plant is above the melting point of sulphur, it being understood, however, that temperatures higher, say, than 130° C. are unnecessary. When the requisite temperature is reached the injecting pump $g$ is started and the needle valve $h$ opened so that the molten sulphur (which has been previously weighed or measured by volume) is injected into the circulating system and thereupon the jetting valve is adjusted to give the required pressure upon the jets. When all the sulphur has been passed into the protective colloid the needle valve $h$ is closed and circulation of the emulsion is continued until the required fineness is achieved. The heating medium is now shut off from the system and cold water may be circulated through the coil or jackets to cool the batch to below its boiling point whereupon the outlet valve from the circulating system is opened and the emulsion passed to a chilling roll or other suitable chilling apparatus. Alternatively the emulsion may be cooled in the plant but this is not so satisfactory as it is liable to become pasty and choke the plant.

In order to divert the whole of the batch to the chilling apparatus the inlet valve $o$ from the circulating system to the heating or cooling vessel is closed.

In place of injecting the sulphur into the protective colloid by means of a pump it may be introduced by pressure or by gravity.

The protective colloid solution which we prefer consists of sulphite residue but glue may be employed and conveniently caustic soda or sodium carbonate may be introduced to impart alkalinity.

The formula may be varied considerably both in sulphur (up to about 75 per cent.) and sulphite lye content (not below 2 per cent.) and as an example of a formula which we have found to be satisfactory we give the following:

| | Per cent. |
|---|---|
| Sulphite lye (50% solids) | 8.0 |
| Caustic soda | 0.1 |
| Water | 26.9 |
| Sulphur | 65.0 |

The material so produced is a cream-coloured liquid which on standing sets to a paste, the consistency of which varies with the percentage of sulphur. With 60 per cent. sulphur it is soft while with 70 per cent. sulphur it is fairly firm but these pastes liquefy on stirring and are then unstable separating into a lower very stiff layer of sulphur and an upper layer of aqueous protective colloid. They can, however, be stabilised by the addition of known thickening agents and preservatives.

Although the pastes so produced have many commercial uses it is often preferable to produce the dispersible sulphur in powder form, and in accordance with our invention this is accomplished by making suitable additions of sulphite residue, soda ash and sodium sulphate and subsequently drying with stirring in vacuo, it being found also that slight alkalinity imparted by sodium carbonate or the like assists re-dispersion of the powder.

An example of a suitable formula is the following:

| | Parts |
|---|---|
| Dispersible sulphur paste (70% sulphur) | 90 |
| Sulphite residue (or sulphite lye to give) | 2 |
| Sodium carbonate | 1 |
| Sodium sulphate (anhydrous) | 7 |

In operation the dispersible sulphur paste is first liquefied in a vacuum drier by stirring and the powders are added and mixed to form a stiff paste. The pressure is then reduced in the apparatus and drying is carried out under such reduced pressure at a temperature preferably not above 75 to 80° C. We find that the conditions and extent of the drying influence re-dispersion as, for example, by drying to a moisture content of 8 to 10%, ability to re-disperse the dried powder in water is almost complete whereas if the drying be carried out to completion the dispersion of the powders suffers to some extent although it is still of a very high order and can be further improved by a creaming process before use. These partially or completely dried powders can be packed in metal containers which would be attacked by the wet paste and in addition they are of higher sulphur content and very easily handled and more cheaply transported.

It is not necessary to grind the partially dried powder but the completely dried powders are preferably ground and it is found that the usual dangers from fire in the grinding of sulphur are much less pronounced with this type of product while the particle size is much smaller than with the best ground sulphurs.

As above indicated the particle size may be controlled by varying the pressure at the jetting valve and we have found that with a pressure of, say, 300 lb. per square inch the majority of the particles are 5 mu or less while at 600 lb. per square inch the majority are 2.5 mu or less.

It will be understood that the invention is not to be limited to the particular constructional details of the apparatus hereinbefore given by way of example since we may vary the means for heating and circulating the protective colloid and the arrangements adopted for introducing the molten sulphur thereinto depending upon any practical requirements that may have to be fulfilled.

We claim:

1. A process for producing dispersible sulphur in powder form which consists in emulsifying a mixture of molten sulphur and a protective colloid solution, cooling the emulsion to form a paste, thickening the paste and finally drying in vacuo.

2. A process for the production of dispersible sulphur which consists in emulsifying a mixture of molten sulphur and a protective colloid consisting of a solution of sulphite lye and an alkaline reagent in water, cooling the emulsion to form a paste, thickening the paste and finally drying in vacuo.

3. A process according to claim 2 in which the paste is thickened with sulphite residue, soda ash and sodium sulphate.

4. A process according to claim 2 in which the paste is thickened by addition of sulphite residue, sodium carbonate and sodium sulphate, the ingredients being present in the following proportions:

| | Parts |
|---|---|
| Dispersible sulphur parts (70% sulphur) | 90 |
| Sulphite residue (or sulphite lye to give) | 2 |
| Sodium carbonate | 1 |
| Sodium sulphate (anhydrous) | 7 |

5. A process according to claim 2 in which the drying is carried out to an extent leaving a moisture content of from 8 to 10 per cent.

DAVID ROLLO.
RONALD McINTYRE.
EDWARD SYDNEY REDVERS WILLMORE.